(12) United States Patent
Baudu

(10) Patent No.: US 9,701,216 B2
(45) Date of Patent: Jul. 11, 2017

(54) DEVICE FOR DETECTING THE POSITION OF A PERSON SITTING ON A CUSHION

(71) Applicant: Faurecia Sieges D'Automobile, Nanterre (FR)

(72) Inventor: Samuel Baudu, Boulogne Billancourt (FR)

(73) Assignee: Faurecia Sieges D'Automobile, Nanterre (FR)

( * ) Notice: Subject to any disclaimer, the term of this patent is extended or adjusted under 35 U.S.C. 154(b) by 338 days.

(21) Appl. No.: 14/419,878

(22) PCT Filed: Aug. 5, 2013

(86) PCT No.: PCT/FR2013/051886
§ 371 (c)(1),
(2) Date: Feb. 5, 2015

(87) PCT Pub. No.: WO2014/023905
PCT Pub. Date: Feb. 13, 2014

(65) Prior Publication Data
US 2015/0210186 A1 Jul. 30, 2015

(30) Foreign Application Priority Data
Aug. 6, 2012 (FR) ...................... 12 57624

(51) Int. Cl.
*B60N 2/00* (2006.01)
*B60R 21/015* (2006.01)
*G01K 3/00* (2006.01)
*G01B 21/16* (2006.01)

(52) U.S. Cl.
CPC ........ *B60N 2/002* (2013.01); *B60R 21/01512* (2014.10); *G01B 21/16* (2013.01); *G01K 3/00* (2013.01)

(58) Field of Classification Search
CPC .................................................. G01K 2213/00
See application file for complete search history.

(56) References Cited

U.S. PATENT DOCUMENTS 6,490,515 B1 * 12/2002 Okamura ............... B60N 2/002
  180/273
2005/0023810 A1 * 2/2005 Basir ................. B60R 21/01532
  280/735
2005/0072250 A1 4/2005 Brown
(Continued)

FOREIGN PATENT DOCUMENTS

DE 102007035924 A1 1/2009
EP 1065097 A1 1/2001
(Continued)

OTHER PUBLICATIONS

"Written Opinion of the International Preliminary Examination Authority" issued in counterpart PCT International Application No. PCT/FR2013/051886, dated Oct. 17, 2013.
(Continued)

*Primary Examiner* — Clayton E Laballe
*Assistant Examiner* — Leon W Rhodes, Jr.
(74) *Attorney, Agent, or Firm* — Kaplan Breyer Schwarz, LLP

(57) ABSTRACT

A device for detecting the position of a person on a cushion includes at least two moisture sensors located in the cushion.

15 Claims, 2 Drawing Sheets

(56) References Cited

U.S. PATENT DOCUMENTS

| | | | | |
|---|---|---|---|---|
| 2006/0244289 A1* | 11/2006 | Bedro | ................ | B60N 2/5621 |
| | | | | 297/180.1 |
| 2011/0270422 A1* | 11/2011 | Chang | ................ | G05B 13/048 |
| | | | | 700/30 |
| 2014/0039351 A1* | 2/2014 | Mix | ................ | A61B 5/1114 |
| | | | | 600/587 |

FOREIGN PATENT DOCUMENTS

| | | | |
|---|---|---|---|
| EP | 1621411 A1 | | 2/2006 |
| EP | 1857330 A1 | | 11/2007 |
| JP | 2011240726 A | * | 12/2011 |

OTHER PUBLICATIONS

"International Search Report", dated Oct. 1, 2013 issued in counterpart PCT International Application No. PCT/FR2013/051886.

\* cited by examiner

DEVICE FOR DETECTING THE POSITION OF A PERSON SITTING ON A CUSHION

BACKGROUND

The present invention relates to a device for detecting the position of a person on a seat cushion, particularly the cushion of the seat bottom piece of a motor vehicle seat.

DISCUSSION OF THE RELATED ART

Seats comprising a device for detecting the person's position on the seat have been described. As an example, U.S. Pat. No. 6,345,839 describes a seat provided with a detection device comprising pressure sensors distributed in the seat bottom piece and the backrest of the seat. The device measures parameters relative to the seat occupant, for example the height and the weight, to determine whether it is a person or an object.

However, devices using pressure sensors require the use of a significant number of sensors to accurately determine a person's position on the cushion and particularly to be able to detect the person's displacement on the cushion. The cost of the detection device may then be high and the installing of the pressure sensor may be delicate.

Further, in order for the detection device to be able to determine whether the seat occupant is a person or an object, it is necessary to provide pressure sensors both in the seat bottom piece and in the backrest. The minimum number of pressure sensors to be provided is thus high and the detection device may have a complex structure. Further, the risk of a detection error between a person and an object cannot be totally avoided.

SUMMARY

An object of an embodiment of the invention is to overcome all or part of the disadvantages of known devices for detecting a person's position on a cushion.

Another object of an embodiment of the invention is to be able to determine the position and the displacements of the person on the cushion with a small number of sensors.

Another object of the present invention is for the detection device to comprise no pressure sensor.

Thus, an aspect of an embodiment of the present invention provides a device for detecting the position of a person on a cushion comprising at least two temperature and/or moisture sensors located in the cushion.

According to an embodiment, the device further comprises means capable of receiving signals representative of moisture delivered by the at least two moisture sensors and of deducing therefrom the position of a person on the cushion.

According to an embodiment of the present invention, the two sensors are distant by at least 80 mm.

According to an embodiment of the present invention, the two sensors are aligned parallel to the longitudinal direction of the cushion.

According to an embodiment of the present invention, the device comprises at least three sensors.

According to an embodiment of the present invention, said at least three sensors are aligned.

Another aspect of an embodiment of the invention provides a system comprising:
a cushion; and
a device such as previously defined.

According to an embodiment of the present invention, the system comprises at least a display screen and/or a speaker.

According to an embodiment of the present invention, the system comprises an actuator capable of modifying the position and/or the shape of the cushion.

According to an embodiment of the present invention, the cushion comprises a padding, a cover, and a layer interposed between the padding and the cover, the temperature and/or moisture sensors being located in said layer.

According to an embodiment of the present invention, the layer is made of a material permeable to air and/or which is a good heat conductor.

Another aspect of an embodiment of the invention provides a seat comprising a seat bottom piece, a backrest, and a system such as previously defined, the seat bottom piece comprising a frame at least partly covered with the cushion.

Another aspect of an embodiment of the invention provides a method comprising the steps of:
delivering signals representative of temperature and/or of moisture delivered by at least two temperature and/or moisture sensors located in a cushion; and
deducing therefrom the position of a person on the cushion.

According to an embodiment of the present invention, the method comprises, for each temperature and/or moisture sensor, comparing with a threshold the signal or the variation rate of the signal delivered by said temperature and/or moisture sensor.

According to an embodiment of the present invention, the method comprises delivering a visual and/or acoustic message when the person is in at least one sitting position from among a plurality of sitting positions.

According to an embodiment of the present invention, the method comprises modifying the position and/or the shape of the cushion when the person is in at least one sitting position from among a plurality of sitting positions.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the various drawings and, further, the various drawings are not to scale.

DETAILED DESCRIPTION

Figure 1:
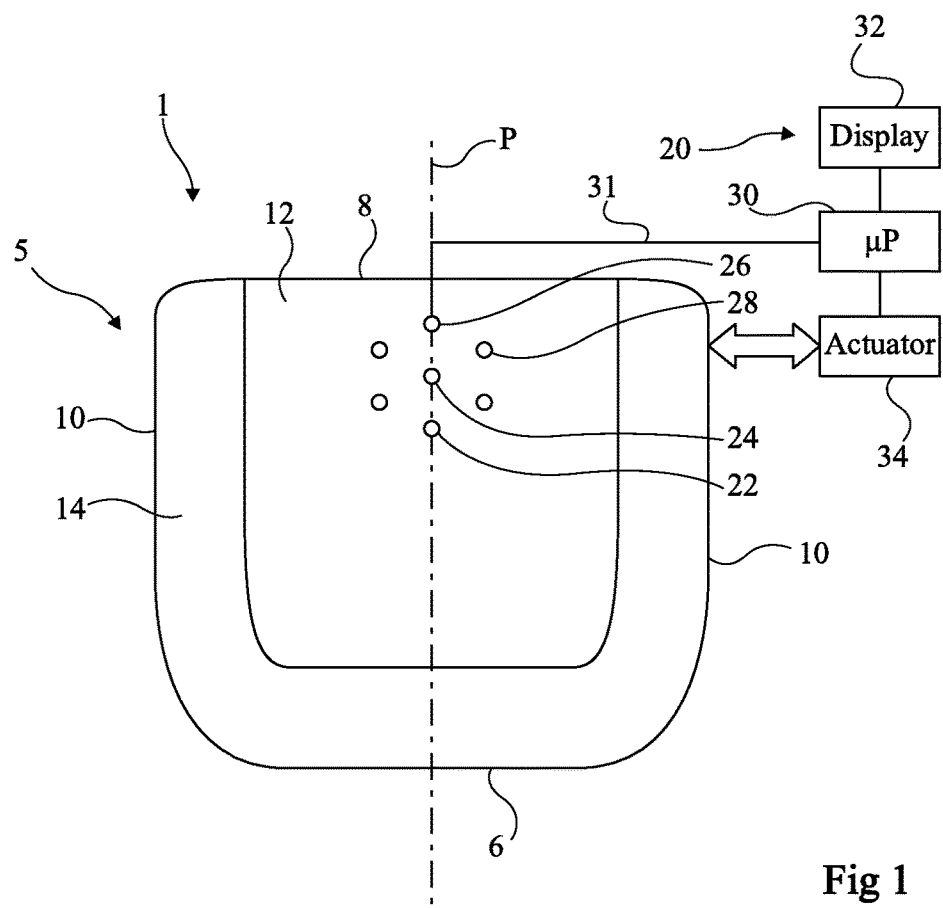
FIG. 1 is a partial simplified top view of an embodiment according to the invention of a seating cushion of a motor vehicle seat and of a device for detecting the position of a person on the cushion.

In the following description, expressions "substantially", "around", and "approximately" mean "to within 10%". Further, adjectives "front" and "back" are used relative to the longitudinal direction of a seat cushion, that is, substantially parallel to the axis of the thigh bone of a person conventionally sitting on the seat cushion. Further, only those elements which are necessary to the understanding of the present invention will be described and shown in the drawings. In particular, the frame and the seat position adjustment means have not been shown in detail.

FIG. 1 shows an embodiment according to the invention of a system 1 comprising a seat bottom piece or seating cushion 5. Cushion 5 comprises a front edge 6, a back edge 8, and two opposite lateral edges 10 each connecting front edge 6 to back edge 8. Cushion 5 further comprises a central portion 12 and a peripheral portion 14 surrounding a portion of central portion 12 along front edge 6 and lateral edges 10. Cushion 5 may have a symmetrical or approximately symmetrical shape. Call P the vertical plane parallel to the longitudinal direction of cushion 5 and which separates cushion 5 in two substantially symmetrical portions.

System 1 comprises a device 20 for detecting the position of a person on cushion 5. Device 20 comprises at least two temperature and/or moisture sensors arranged in cushion 5, at the level of central portion 12 of the cushion, and preferably arranged in plane of symmetry P. Device 20 may comprise at least three temperature and/or moisture sensors substantially aligned parallel to the longitudinal direction of the cushion and located in plane P. Temperature sensor means a sensor capable of delivering a signal representative of the temperature in the vicinity of the sensor. Moisture sensor designates a sensor capable of delivering a signal representative of the air moisture in the vicinity of the sensor. It may be the relative moisture, that is, the ratio of the vapor pressure to the saturating vapor pressure, or the absolute moisture, that is, the ratio of the water vapor mass to a unit air volume.

In FIG. 1, three temperature and/or moisture sensors 22, 24, and 26 respectively called front sensor 22, central sensor 24, and back sensor 26, are shown. Central sensor 24 is located between front sensor 22 and back sensor 26. Front sensor 22 is the frontmost sensor of the three sensors 22, 24, and 26 and back sensor 26 is the rearmost sensor of the three sensors 22, 24, and 26. Preferably, sensors 22, 24, and 26 are aligned, and preferably parallel to the longitudinal direction of cushion 5. Preferably, sensors 22, 24, and 26 are located in plane P. Preferably, sensors 22, 24, and 26 are located at the back of cushion 5, preferably in the back half of cushion 5, more preferably in the back third of cushion 5.

As a variation, additional temperature and/or moisture sensors may be provided and aligned with sensors 22, 24, 26.

As an example, the distance separating sensors 22 and 24 is in the range from 40 mm to 140 mm, preferably from 80 mm to 140 mm, for example, approximately 120 mm, or preferably from 40 mm to 120 mm, for example, approximately 60 mm. The distance separating sensors 24 and 26 is in the range from 40 mm to 140 mm, preferably from 80 mm to 140 mm, for example, approximately 120 mm, or preferably from 40 mm to 120 mm, for example, approximately 60 mm.

Device 20 may further comprise additional temperature and/or moisture sensors 28 arranged on either side of plane P. Preferably, additional sensors 28 are symmetrically distributed on either side of plane P.

The signal delivered by each sensor may be a signal representative only of the temperature in the vicinity of the sensor, only of the air moisture in the vicinity of the sensor, or representative both of the temperature in the vicinity of the sensor and of the air moisture in the vicinity of the sensor. Preferably, all sensors deliver the same type of signal, that is, all sensors are temperature sensors, all sensors are moisture sensors, or all sensors are temperature and moisture sensors.

The temperature sensors may be sensors of thermocouple type or of resistance probe type. They may for example be the sensors sold by SENSIRION under name STS21.

The moisture sensors, or hygrometers, may be capacitive moisture sensors, resistive moisture sensors, or psychrometers. They may for example be the sensors sold by SENSIRION under name STH21.

Sensors 22, 24, 26, 28 are connected to a processing unit 30 (μP). Processing unit 30 may comprise a microcontroller. The connection between each sensor 22, 24, 26, 28 and processing unit 30 may be a dedicated wire connection, a single wire connection 31 being shown as an example in FIG. 1. However, the signals delivered by sensors 22, 24, 26, 28 may be transmitted to processing unit 30 by any means, for example, over a data bus shared by the sensors.

Device 20 further comprises an interface unit 32 (Display) connected to processing unit 30. Interface unit 32 may comprise a display screen and/or a speaker, for example, located in the instrument panel, an armrest of the seat, a center console of the vehicle, etc. Processing unit 30 may control interface unit 32 for the transmission of a message to the person in the seat, for example, the displaying of an image on a display screen or the emission of an acoustic message by a speaker.

Further, detection device 20 may comprise an actuation unit 34 (Actuator) connected to processing unit 30. Actuator 34 comprises a device capable, based on signals delivered by processing unit 30, of modifying the shape and/or the position of cushion 5. Unit 34 may comprise one or a plurality of actuators capable of displacing cushion 5, for example, along the longitudinal direction of cushion 5, or along a direction perpendicular to the longitudinal direction, for example, along the vertical direction. Unit 24 may comprise a system capable of inflating or of deflating one or a plurality of inflatable bladders present in cushion 5 or capable of displacing a rigid element arranged in the cushion to modify the general shape of cushion 5. Actuator 34 may be omitted.

Figure 2:
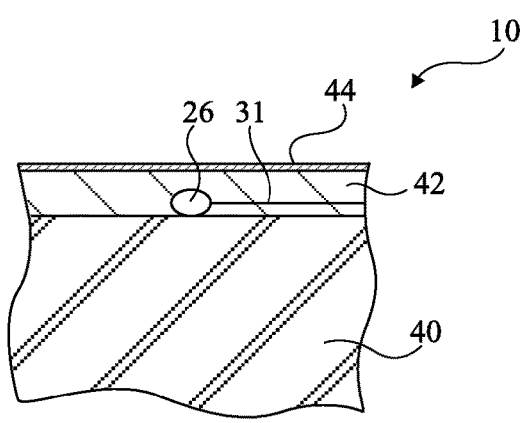
FIG. 2 is a partial simplified lateral cross-section view of the cushion of FIG. 1.

FIG. 2 partially and schematically shows a cross-section view of cushion 5 of FIG. 1 along plane P. A portion only of cushion 5 is shown. Cushion 5 comprises a padding 40, for example, made of polyurethane foam. Padding 40 is at least partially covered with a layer 42 of a material different from that of padding 40. Layer 42 is covered with a cover 44. The temperature and/or moisture sensors are located at the level of layer 42. As an example, only sensor 26 and the associated wire connection 31 are shown in FIG. 2. Preferably, the temperature and/or moisture sensors are located less than 1 centimeter away from cover 44.

Preferably, particularly in the case where at least one of sensors 22, 24, 26, 28 is a moisture sensor, layer 42 and cover 44 are permeable to air. Cover 44 may be made of a woven or nonwoven material. Cover 44 may be made of leather. In this case, cover 44 advantageously comprises openings for allowing the passage of air. The air permeability of layer 42 and of cover 44 may be greater than 1,000 $l \cdot s^{-1} \cdot m^{-2}$ (permeability measured according to ISO standard 9237: 1995 "Textiles—Détermination de la perméabilité à l'air des étoffes").

Preferably, particularly in the case where at least one of sensors 22, 24, 26, 28 is a temperature sensor, the materials which form layer 42 and cover 44 are good heat conductors. The heat conductivity of the materials forming layer 42 and cover 44 may be greater than 0.03 $W \cdot m^{-1} \cdot K^{-1}$.

Layer 42 is for example made of three-dimensional fabric. It may for example be the three-dimensional fabric commercialized by Müller Textil under name 3Mesh. The thickness of layer 42 is for example in the range from 5 mm to 1 cm, for example, approximately 10 mm.

The presence of layer 42 having sensors 22, 24, 26, 28 arranged therein enables to avoid imposing additional constraints relative to the selection of the material used for padding 40. In the case where padding 40 is made of a material permeable to air and/or which is a good heat conductor, layer 42 may be omitted and sensors 22, 24, 26, 28 are then arranged in padding 40.

Figures 3, 4:
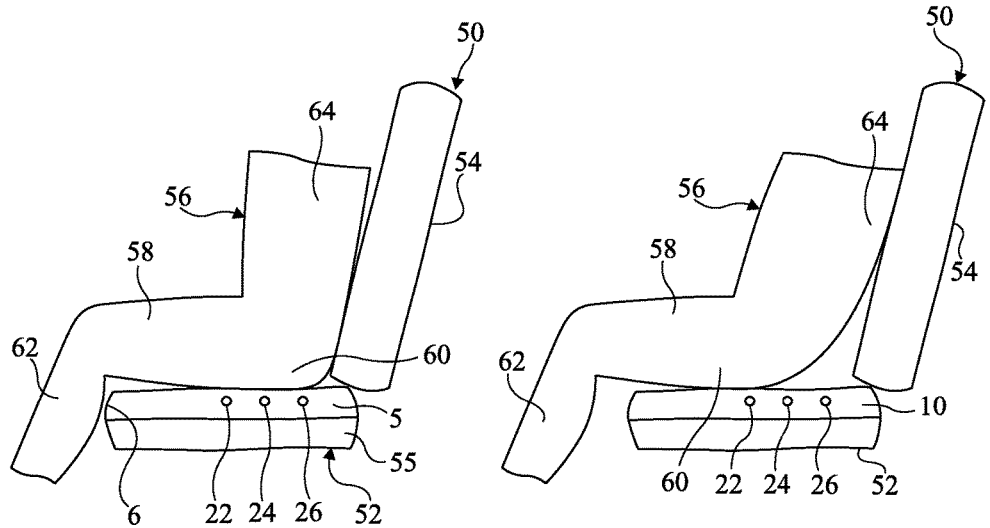
FIGS. 3 and 4 schematically show, in partial simplified lateral views, a person on a seat comprising the seating cushion of FIG. 1, respectively when the person is well seated and when he/she is not well seated.

FIGS. 3 and 4 show a seat 50, for example, a motor vehicle seat, comprising a seat bottom piece 52 and a backrest 54. Backrest 54 may be pivotally connected to seat bottom piece 52. Seat bottom piece 52 is provided with cushion 5 shown in FIG. 1. As an example seat bottom piece 52 comprises a frame 55, cushion 5 being attached to frame 55.

FIGS. 3 and 4 are simplified cross-section views of seat 50 in plane P. FIGS. 3 and 4 show the partial contour of a person 56 sitting on seat 50, particularly thigh 58, hip 60, a portion of leg 62, and a portion of back 64 of person 56.

It is generally considered that person 56 sitting on seat 50, particularly the driver of a motor vehicle, is in a correct sitting position, particularly to prevent back pain, when the lower portion of back 64 of person 56 bears against backrest 54. An example of correct sitting position is shown in FIG. 3. Conversely, the position shown in FIG. 4 is not a correct sitting position. Indeed, in FIG. 4, person 56 has displaced the joint center of hip 60 towards the front of seat bottom piece 52 so that the lower portion of his/her back 64 does not fully bear against backrest 54. Such an incorrect position may particularly favor back pain.

The inventor has shown that by placing at least two temperature and/or moisture sensors at the level of cushion 5 of the seat bottom piece in two different positions, preferably in two different positions along the longitudinal direction of the seat bottom piece distant by at least 80 mm, it is possible to detect a variation of the person's position on the seat. Preferably, central sensor 24 is located vertically in line with the joint center of hip 60 of person 56 when he/she is correctly seated.

Figure 5:
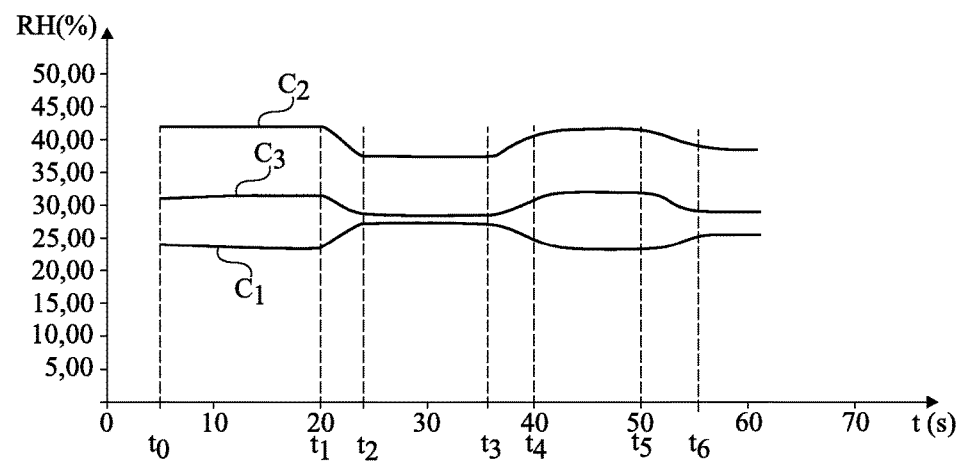
FIG. 5 shows curves of the variation along time of the moisture rate measured by the sensors of the detection device of FIG. 1 for the positions of the person shown in FIGS. 3 and 4.

FIG. 5 shows curves $C_1$, $C_2$, and $C_3$ of the variation along time of moisture rate RH, which have been previously measured by front sensor 22 for curve $C_1$, by central sensor 24 for curve $C_2$, and by back sensor 26 for curve $C_3$. Times $t_0$ to $t_6$ are successive times. The measurements have been performed for a motor vehicle seat 50 comprising three moisture sensors 22, 24, 26 arranged in plane P of cushion 5. The distance between sensors 22 and 24 was 120 mm and the distance between sensors 24 and 26 was 120 mm. Back sensor 26 was distant by 40 mm from back edge 8 of cushion 5.

The measurement has started at time $t_0$. Between times $t_0$ and $t_1$, person 56 has remained substantially in the position shown in FIG. 3 and the moisture rates measured by sensors 22, 24, and 26 have remained substantially constant.

Between times $t_1$ and $t_2$, occupant 56 has moved from the position shown in FIG. 3 to the position shown in FIG. 4. In particular, the joint center of hip 60 of person 56 has been displaced towards the front of cushion 5. This translates, between times $t_1$ and $t_2$, as a decrease in the moisture rate measured by central sensor 24, as a decrease in the moisture rate measured by back sensor 26, and as an increase in the moisture rate measured by front sensor 22.

Between times $t_2$ and $t_3$, person 56 has remained substantially in the position shown in FIG. 4 and the moisture rates measured by sensors 22, 24, and 26 have remained substantially constant.

Between times $t_3$ and $t_4$, person 56 has moved from the position shown in FIG. 4 to the position shown in FIG. 3. In particular, the joint of hip 60 of person 56 has been displaced towards the back of cushion 5. This translates, between times $t_3$ and $t_4$, as an increase in the moisture rate measured by central sensor 24, as an increase in the moisture rate measured by back sensor 26, and as a decrease in the moisture rate measured by front sensor 22.

Between times $t_4$ and $t_5$, person 56 has remained substantially in the position shown in FIG. 3 and the moisture rates measured by sensors 22, 24, and 26 have remained substantially constant.

Between times $t_5$ and $t_6$, person 56 has moved from the position shown in FIG. 3 to the position shown in FIG. 4.

In the case where the sensors used are temperature sensors, the temperature variation curves measured by the sensors have a general shape similar to curves $C_1$, $C_2$, and $C_3$.

Processing unit 30 is capable of determining the position occupied by person 56 on seat 50 based on the signals delivered by the sensors.

This is for example done by comparing the measured signals, or the variation rate of the measured signals, relative to thresholds, knowing that a different temperature and/or moisture threshold may be associated with each sensor. Indeed, the inventor has shown that the difference in temperatures or moistures (relative or absolute) measured by a sensor is greater than 8% when the person changes his/her position on cushion 5. This difference is large enough to enable to use temperature or moisture as an indicator of the person's position on cushion 5. Further, the use of temperature or of moisture enables to only detect the presence of a person 56 on cushion 5, and not that of objects.

As an example, processing unit 30 determines that person 56 moves from the position shown in FIG. 3 when, simultaneously and for at least 1 second:

the temperature (or moisture) variation rate measured by front sensor 22 is negative and higher, in absolute value, than a first threshold;

the temperature (or moisture) variation rate measured by middle sensor 24 is positive and higher, in absolute value, than a second threshold; and the temperature (or moisture) variation rate measured by back sensor 26 is positive and higher, in absolute value, than a third threshold.

As an example, processing unit 30 determines that person 56 moves from the position shown in FIG. 4 when, simultaneously and for at least 1 second:

the temperature (or moisture) variation rate measured by front sensor 22 is positive and higher, in absolute value, than a first threshold;

the temperature (or moisture) variation rate measured by middle sensor 24 is negative and higher, in absolute value, than a second threshold; and the temperature (or moisture) variation rate measured by middle sensor 26 is negative and higher, in absolute value, than a third threshold.

According to another example, processing unit 30 determines that person 56 is in the position shown in FIG. 3 when, simultaneously and for a duration greater than 5 s:

the temperature (or the moisture) measured by front sensor 22 is lower than a first threshold;

the temperature (or the moisture) measured by middle sensor 24 is higher than a second threshold; and the temperature (or the moisture) measured by back sensor 26 is higher than a third threshold.

According to another example, processing unit 30 determines that person 56 is in the position shown in FIG. 4 when, simultaneously and for a duration greater than 5 s:

the temperature (or the moisture) measured by front sensor 22 is higher than a first threshold;

the temperature (or the moisture) measured by middle sensor 24 is lower than a second threshold; and the temperature (or the moisture) measured by back sensor 26 is lower than a third threshold.

In the other cases, processing unit 30 may consider that the position of person 56 sitting on seat 50 is not determined.

The use of two sensors only may be sufficient to determine the position of person 56 on seat 50. However, the use of at least three temperature and/or moisture sensors advantageously enables to decrease cases of incorrect detection.

As a variation, when sensors are temperature and moisture sensors, processing unit 30 may determine a first position of person 56 on seat 50 based on the temperature measurements and a second position of person 56 on seat 50 based on the moisture measurements and consider that the person's position can be determined only if the first and second positions are the same.

When a position variation of person 56 on seat 50 is detected, processing unit 30 may perform at least one of the following actions:

transmission of an alert signal to person 56 sitting on seat 50 via interface unit 32. It may be an image displayed on a screen or an acoustic signal; and/or automatic modification of the position and/or of the shape of cushion 5 to take back person 56 to the correct position shown in FIG. 3 or at least entice person 56 to return to the correct position shown in FIG. 3. It may for example be a displacement of bottom piece 52 of seat 5 towards the back relative to backrest 54. This may further be a raising of the front portion of seat bottom piece 52 with respect to the back portion of seat bottom piece 52 to entice person 56 to press his/her back 64 again against backrest 54.

When lateral temperature and/or moisture sensors 28 are present, processing unit 30 may further determine whether person 56 sitting in seat 50 is laterally shifted with respect to the ideal position for which person 56 is placed substantially symmetrically with respect to plane P.

Specific embodiments of the present invention have been described. Various alterations and modifications will occur to those skilled in the art. In particular, although the previously-described embodiments relate to a motor vehicle seat, it should be clear that the present invention may be implemented with any type of seat on which a person has to remain seated for a significant time, particularly, an office chair.

The invention claimed is:

1. A device for detecting the position of a person on a cushion comprising at least two moisture sensors located in the cushion; and means capable of receiving signals representative of moisture delivered by the at least two moisture sensors and for deducing therefrom a first position of the person on the cushion; and at least two temperature sensors located in the cushion, said means being capable of receiving signals representative of temperature delivered by the at least two temperature sensors and of deducing therefrom a second position of the person on the cushion, said means being further capable of determining the person's position only if the first and second positions are the same.

2. The device of claim 1, wherein the two moisture and/or temperature sensors are distant by at least 40 mm.

3. The device of claim 1, wherein the two moisture and/or temperature sensors are aligned parallel to the longitudinal direction of the cushion.

4. The device of claim 1, further comprising at least a third moisture sensors.

5. The device of claim 4, wherein said at least three moisture sensors are aligned.

6. A system comprising:
a cushion; and
a device for detecting the position of a person on a cushion, the device comprising:
at least two moisture sensors located in the cushion; and
means capable of receiving signals representative of moisture delivered by the at least two moisture sensors and for deducing therefrom a first position of the person on the cushion; and
at least two temperature sensors located in the cushion, said means being capable of receiving signals representative of temperature delivered by the at least two temperature sensors and of deducing therefrom a second position of the person on the cushion, said means being further capable of determining the person's position only if the first and second positions are the same.

7. The system of claim 6, further comprising at least a display screen and/or a speaker.

8. The system of claim 6, further comprising an actuator capable of modifying the position and/or shape of the cushion.

9. The system of claim 6, wherein the cushion comprises a padding, a cover, and a layer interposed between the padding and the cover, the moisture sensors being located in said layer.

10. The system of claim 9, wherein the layer is made of a material permeable to air and/or which is a good heat conductor.

11. A seat comprising a bottom piece, a backrest, and the system of claim 6, the seat bottom piece comprising a frame at least partly covered with the cushion.

12. A method comprising the steps of:
delivering signals representative of moisture delivered by at least two moisture sensors located in a cushion and deducing therefrom a first position of a person on the cushion;
delivering signals representative of temperature delivered by at least two temperature sensors located in a cushion and deducing therefrom a second position of the person on the cushion; and
determining the person's position only if the first and second positions are the same.

13. The method of claim 12, further comprising, for each moisture sensor, comparing with a threshold the signal or the variation rate of the signal delivered by said moisture sensor.

14. The method of claim 12, further comprising delivering a virtual and/or acoustic message when the person is in at least one sitting position from among a plurality of sitting positions.

15. The method of claim 12, further comprising modifying the position and/or the shape of the cushion when the person is in at least one sitting position from among a plurality of sitting positions.

* * * * *